Jan. 6, 1942.  W. SPECHT  2,269,233
ELECTRICAL CONDUCTOR
Filed March 5, 1940
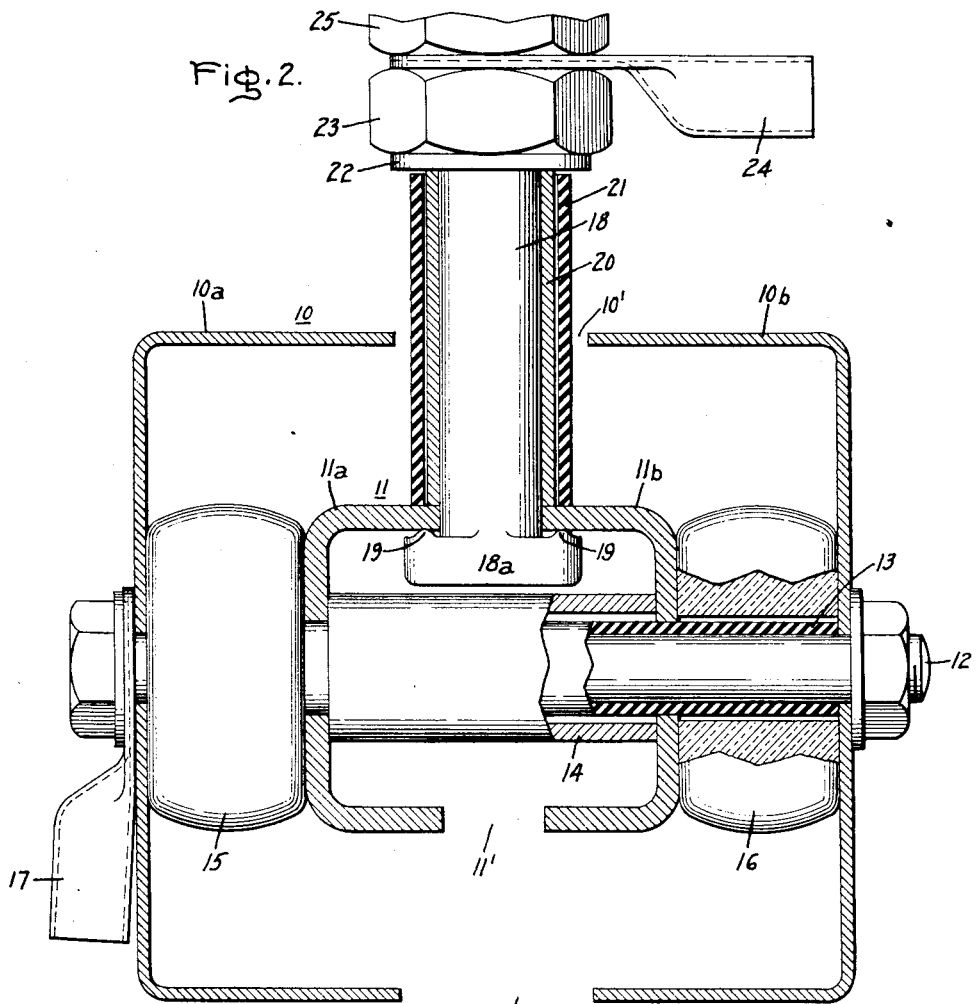
Inventor:
Woldemar Specht,
by Harry E. Dunham
His Attorney.

Patented Jan. 6, 1942

2,269,233

UNITED STATES PATENT OFFICE 2,269,233

ELECTRICAL CONDUCTOR

Woldemar Specht, Philadelphia, Pa., assignor to General Electric Company, a corporation of New York Application March 5, 1940, Serial No. 322,359

5 Claims. (Cl. 174—16)

My invention relates to electrical conductors and more particularly to bus bar structures or assemblies of the type adapted to carry currents of great magnitude.

An object of my invention is to provide a bus bar structure which is highly efficient in operation, providing a simple, reliable and inexpensive assembly, economically manufactured and installed, which combines great current-carrying capacity with a structure well adapted to withstand the forces incident to the magnetic fields associated with such bus bar assemblies.

It is another object of my invention to provide a new and improved bus bar arrangement having a low reactance.

It is a further object of my invention to provide a low-reactance bus bar assembly having great current-carrying capacity wherein connections thereto may readily be made at any point without requiring any additional equipment or the like.

Further objects and advantages of my invention will become apparent as the following description proceeds and the features of novelty which characterize my invention will be pointed out with particularity in the claims annexed to and forming a part of this specification.

Because of the skin effect occurring in a conductor carrying alternating currents, it has been found that tubular conductors will transmit alternating currents much more efficiently than solid conductors constructed of the same amount of material. In view of the difficulty of making connections with tubular conductors, however, schemes have been proposed which approach the efficiency of the tubular conductor in current-carrying capacity without the inherent disadvantages.

In some bus bar installations, such as are used, for example, in connection with certain welding machines, the bus bars must be arranged to conduct very high currents at low voltages and, in order to avoid excessive voltage drops, it is essential that the bus structure affords very little reactance. Concentric tubular conductors would afford a bus structure meeting this requirement of low reactance but would present difficulties in connection with cooling of the bus bars especially where high currents were involved. Also, since a great many welding machines may be energized from the same bus structure at intervals therealong, it would be desirable to provide means for making electrical connections with the bus bars at any place therealong in a simple manner without requiring additional drilling of the bus bar or the like, which would be impossible with concentric tubular conductors. I have devised the scheme herein disclosed which has numerous advantages over previously arranged bus bars as will be set forth hereinafter since it substantially retains the low reactance afforded by bus bar assemblies comprising concentrically arranged tubular conductors without the inherent disadvantages of poor heat transfer and connection difficulties.

For a better understanding of my invention, reference may be had to the accompanying drawing in which Fig. 1 is a side view of the bus bar structure covered by my invention while Fig. 2 is an enlarged cross-sectional view to aid in understanding the invention.

Although I shall describe my invention particularly in connection with a low-reactance single-phase bus bar structure particularly adaptable for supplying single-phase welding machines, it will be understood by those skilled in the art that my invention is equally applicable to a polyphase bus system wherein low reactance is essential.

Referring now to the drawing, I have illustrated a pair of hollow substantially rectangular conductors 10 and 11 concentrically arranged with conductor 11 located within conductor 10. Conductor 10 comprises a pair of spaced channel shaped members 10a and 10b arranged parellel to one another with their open faces adjacent so as to define a hollow substantially rectangular shaped conductor 10. The channel members 10a and 10b are spaced apart so as to provide longitudinally extending ventilating slots 10'. Similarly, conductor 11 comprises a pair of spaced channel shaped members 11a and 11b arranged parallel to one another with their open faces adjacent so as to define a hollow substantially rectangular shaped conductor 11 provided with longitudinally extending ventilating slots 11'.

Conductors 10 and 11 are mounted so as to form a unitary bus structure. This is accomplished by bolting conductors 10 and 11 together by means of suitable bolts 12 at intervals along the longitudinally extending bus structure. Bolts 12 may be at the potential of conductor 10 and, hence, an insulating sleeve 13 is provided surrounding bolt 12 so that it may pass through rectangular shaped conductor 11 without short circuiting the bus structure. Channel members 11a and 11b are separated by a suitable tubular spacer 14 which may be of metal, surrounding insulating sleeve 13. Suitable cylindrical insulating members 15 and 16, preferably of porcelain, hold channel members 10a and 11a and 10b and 11b, respectively, in spaced relationship. It will be understood by those skilled in the art that, by this arrangement, conductors 10 and 11 form a unitary bus structure wherein the conductors are insulated from one another and yet supported in such a manner as to withstand the stresses incident to the magnetic fields set up by currents flowing therethrough.

Electrical connections to the outer conductor 10 may be made in any suitable manner and I have illustrated a terminal 17 of an electrical conductor as held in current-conducting relation with conductor 10 by means of bolt 12. However, this connection may be made in a manner similar to that which will be described hereinafter in connection with conductor 11. Preferably, conductor 10 is the return conductor which may be grounded, in which case, conductor 11 is sufficiently protected so that it is not likely that anything will accidently come in contact therewith. However, to preclude such a possibility, it might be desirable to place a suitable screen or the like over longitudinally extending ventilating slots 10'. Thus if conductor 10 is grounded, the bus structure may be readily supported in any well known manner since conductor 10 offers a protective covering to the live conductor 11 therein. However, it is not necessary that conductor 10 be grounded since it may equally well be supported on suitable insulators and electrical connections made therefrom in a manner similar to that to be described hereinafter with reference to conductor 11.

When low-reactance buses of very high current-carrying capacity are used for supplying energy to welding machines, it is desirable to be able to make electrical connections thereto at any point along the bus structure without additional effort such as drilling holes in the conductors or the like, since it may be necessary to add additional welding machines at various points at any time. Accordingly, I provide suitable power take off connections from the bus bar structure at any place along the conductors thereof without extra drillings in the conductors being required. When it is desired to make an electrical connection, a suitable electrical connector such as a copper bolt or stud 18 is used having an enlarged end portion or head 18a one dimension of which is larger than the width of ventilating slot 11', while the other is small enough to be readily inserted in this slot. This head 18a is provided with a pair of raised contacting surfaces 19, which are preferably formed of a metal the oxide of which does not substantially interfere with electrical current conduction, such as silver, for example. These raised contact portions 19 are of restricted area so as to be adapted to form a high pressure silver-line contact. In order to provide the necessary pressure for the contact, a suitable copper tube 20 of a diameter larger than the width of ventilating slot 11' is slipped over stud 18. In order to insulate stud 18 from conductor 10, a suitable insulating sleeve 21 is placed around copper spacer 20, after which a washer 22 and nut 23 are applied to stud 18. The turning of nut 23 on stud 18 will clamp conductor 11 between copper spacer 20 and the raised contact surfaces 19 so that a high-pressure contact between stud 18 and conductor 11 is obtained. Electrical connection with the welding machine or other suitable apparatus may be made in any desirable manner, such as illustrated in the drawing, for example, where terminal 24 of a suitable conductor, not shown, is electrically connected to conductor 11 by being clamped between nut 23 and nut 25, both associated with stud 18.

By virtue of ventilating slots 10' and 11', air can freely circulate adjacent all the surfaces of the bus bar structure comprising conductors 10 and 11 so that no difficulty due to heating of the bus structure such as is inherent in concentric tubular conductors is encountered. Thus, I have disclosed a new and improved low-reactance bus bar structure wherein the low-reactance characteristic of concentric tubular conductors is substantially approached and yet wherein the disadvantages of tubular conductors with respect to cooling thereof, supporting, and making electrical connections thereto are eliminated.

While I have shown and described a particular embodiment of my invention, it will be obvious to those skilled in the art that various changes and modifications may be made without departing from my invention in its broader aspects and I, therefore, aim in the appended claims to cover all such changes and modifications as fall within the true spirit and scope of my invention.

What I claim as new and desire to secure by Letters Patent of the United States is:

1. In a bus structure, the combination comprising a hollow rectangular shaped conductor including a pair of spaced channel shaped members arranged parallel to one another with their open faces adjacent so as to define said hollow rectangular shaped conductor with a longitudinally extending ventilating slot therein, means for readily making a detachable electrical connection at any point on said conductor comprising an electrical connector having an enlarged end portion for engaging the inner surface of said hollow conductor adjacent said ventilating slot, and means for clamping said connector to the edges of said ventilating slot to make good electrical contact with said conductor.

2. In a low-reactance bus structure, the combination comprising a pair of coaxially mounted hollow rectangular shaped conductors, each of said conductors including a pair of spaced channel shaped members arranged parallel to one another with their open faces adjacent so as to define said hollow rectangular shaped conductors with longitudinally extending ventilating slots therein, means for readily making a detachable electrical connection at any point along one of said conductors comprising an electrical connector having an enlarged end portion with raised contact surfaces thereon for engaging with the inner surface of said one hollow rectangular shaped conductor adjacent the edges of the ventilating slot therein when said enlarged portion is inserted through said ventilating slot, and means for clamping said connector to the edges of said ventilating slot so as to provide a high-contact pressure between said raised contact surfaces and said one hollow rectangular shaped conductor.

3. In a low-reactance bus structure, the combination comprising a pair of concentrically mounted rectangular shaped conductors, each of said conductors including a pair of spaced channel shaped members, each comprising a web and parallel side flanges, arranged parallel to one another with their open faces adjacent so as to define said hollow rectangular shaped conductors, the channel-shaped members of one hollow rectangular-shaped conductor being substantially smaller than the channel-shaped members of said other conductor, insulating means for holding said conductors in spaced relationship, and fastening means passing through the webs of all of said conductors for rigidly tying said concentric conductors together so as to form a unitary structure.

4. In a bus structure, the combination comprising a hollow rectangular shaped conductor including a pair of spaced channel shaped members arranged parallel to one another with their open faces adjacent so as to define said hollow rectangular shaped conductor with a longitudinally extending ventilating slot therein, an electrical connector having an enlarged end portion and constructed so as to be inserted in said ventilating slot with said enlarged end portion engaging with the inner edges of said ventilating slot, said connector being slidable along said ventilating slot, and means for mechanically positioning said connector at any point on said conductor to provide a good electrical connection therewith.

5. In a low-reactance bus structure, the combination comprising a pair of coaxially mounted hollow rectangular shaped conductors, each of said conductors including a pair of spaced channel shaped members arranged parallel to one another with their open faces adjacent so as to define said hollow rectangular shaped conductors with longitudinally extending ventilating slots therein, said outer conductor being maintained at ground potential so as to protect said inner conductor, means for making electrical connections with said inner conductor at any point along the longitudinal extent thereof comprising an electrical connector extending through the ventilating slot of said outer conductor having a head for engaging said inner conductor adjacent the edges of said ventilating slot therein, fastening means for holding the head of said electrical connector in engagement with said inner conductor, and insulating means for said electrical connector at the point where it passes through said ventilating slot in said outer conductor.

WOLDEMAR SPECHT.